Nov. 3, 1931.    W. R. GRISWOLD    1,830,105
DAMPING DEVICE
Original Filed June 27, 1925
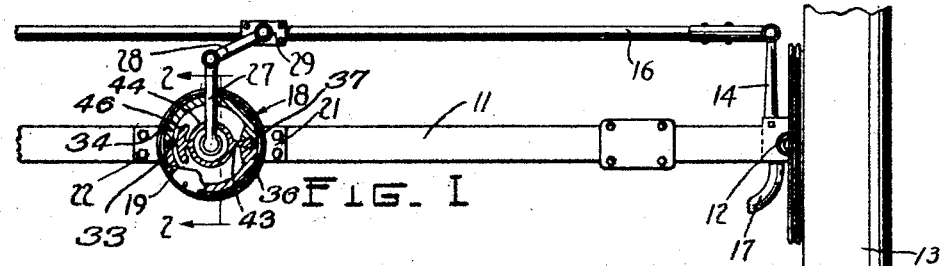
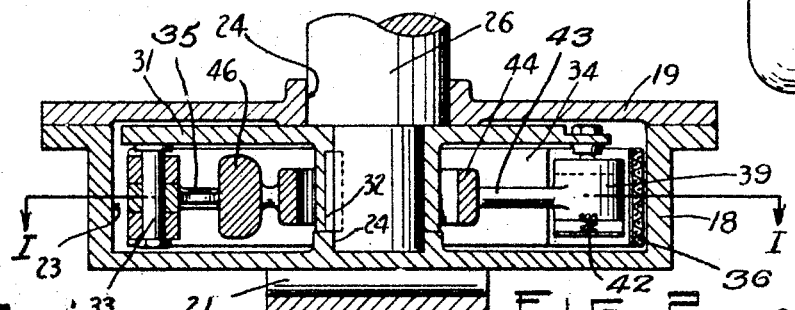
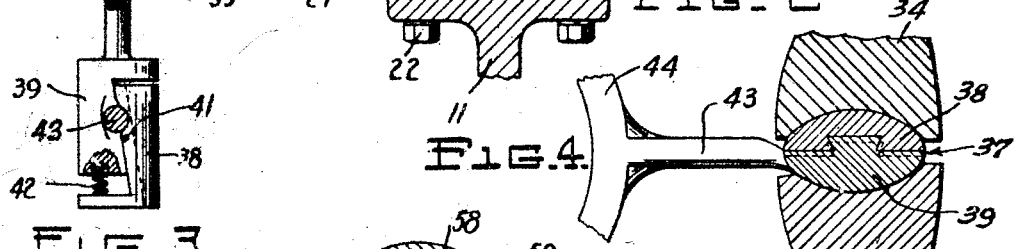
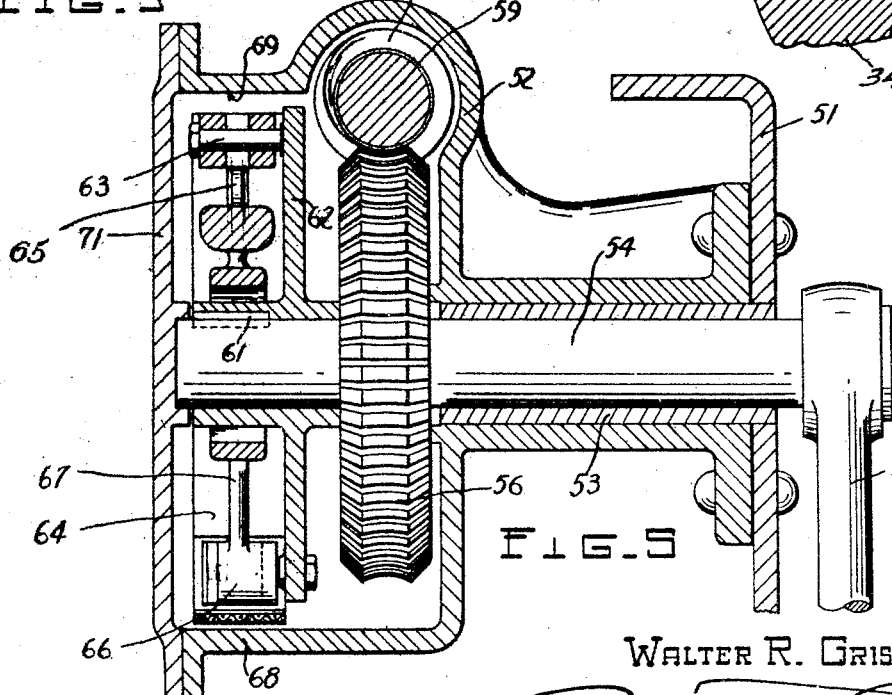
Inventor
WALTER R. GRISWOLD
By Milton Tibbetts
Attorney Patented Nov. 3, 1931

1,830,105

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

DAMPING DEVICE

Original application filed June 27, 1925, Serial No. 39,896. Divided and this application filed February 27, 1928. Serial No. 257,232.

This application is a division of pending application Serial No. 39,896, filed June 27, 1925. The invention relates to damping devices, and particularly to apparatus such as is used for the damping of disturbances in the steering wheels and steering mechanism of motor vehicles.

It has for its principal object to provide a damping device in which the damping effect shall be proportional to the disturbance in the mechanism.

Another object of the invention is to provide damping apparatus which shall be sensitive to disturbances of relatively high frequency.

A further object of the invention is to provide damping apparatus which shall prevent the building up of conditions of vibratory resonance between the moving body and adjacent members.

Other objects of the invention will appear from the following description taken in connection with the drawings, which form a part of this specification, and in which:

Fig. 1 is a plan view partly broken away and partly in section, of the front axle and steering wheel of a motor vehicle showing an application of the invention to the steering mechanism thereof, the parts in section being taken substantially on the line 1—1 of Fig. 2;

Fig. 2 is an enlarged view of part of the apparatus shown in Fig. 1, in vertical section substantially through the center of the device;

Figs. 3 and 4 are detailed views showing the construction of the expanding cam, and Fig. 5 is a transverse section through the steering gear of a motor vehicle, showing an application of the invention thereto.

Referring to the drawing, at 11 is shown the front axle of a motor vehicle, provided at its ends with the usual pivoted steering connections or knuckles 12, on which the front or steering wheels 13 of the vehicle are mounted. Each of the knuckles 12 is provided with a steering arm 14, which arms 14 are connected by a tie rod 16, so that the wheels 13 will be turned together in steering the vehicle. One of the knuckles is also provided with a steering arm 17 which is adapted for actuation by the vehicle steering gear in the usual manner to turn the wheels 13 on their steering axes.

In the operation of modern motor vehicles, particularly those equipped with large, low-pressure tires of the balloon type, it frequently happens that at certain vehicle speeds a rapid oscillation of the wheels 13 on their pivots 12 is set up, taking the form of an oscillatory vibration of considerable amplitude. This phenomenon is destructive of various parts of the vehicle, is exceedingly uncomfortable, and increases the difficulty of steering to a point at which operation of the vehicle is quite dangerous. Such vibration has come to be known in the art as "shimmy" and will be hereinafter so referred to.

The present invention provides a device which may be used to damp shimmy in a vehicle steering mechanism, and absorb the energy developed in such vibration. The axle 11 is provided, intermediate its ends, with a housing 18 of cylindrical form having a removable cover plate 19, and having ears or lugs 21 by which it may be rigidly secured to the axle 11 in any suitable manner, as by the bolts 22. The inner surface of the circular side wall of the housing 18 forms a drum 23. Journaled in suitable aligned bearings 24, formed in lugs in the bottom of the housing 18 and in cover 19 respectively, is a shaft 26, the upper end of which projects through the cover 19 and is provided with an arm 27 rigidly connected thereto in any convenient manner. The end of the arm 27 is pivotally connected to a link 28, the other end of which is pivoted to a clamp 29 secured to the tie rod 16. By this mechanism, movement of the tie rod caused by the swinging of the wheels 13 on their pivots 12, is communicated to the shaft 26, which thus has an oscillatory motion corresponding to that of the pivoted wheels.

A plate 31 is mounted on the shaft 26 within the housing 18, and is rigidly secured to the shaft in any convenient manner as by the key 32. This plate 31 is provided near its periphery with a pivot pin 33 on which is mounted a pair of expanding shoes 34, having strengthening ribs 35, provided with friction lining 36 which is adapted to contact the drum 23 upon expansion of the shoes. Between the adjacent ends of the shoes 34 is mounted an expanding cam 37, formed of two parts 38 and 39, dove-tailed together and provided with cooperating tapered surfaces 41 as clearly shown in Figs. 3 and 4. The cam portions 38 and 39. are urged apart in the direction of their length by a light compression spring 42 mounted between them, the tapered surfaces 41 cooperating to increase the thickness of the cam 37, as will be evident. One of the cam portions, as 39, is provided with an arm 43, which may be integral as shown, forming the shank of a pendulum, which has an enlarged central portion 44, adapted to pass around the shaft 26 and the hub of the plate 31, and which has a suitable weight 46 at its free end.

It will be apparent that the cam 37 provides a pivotal mounting for the pendulum 43 between the adjacent ends of the shoes 34 and that by reason of its expanding action all back lash and lost motion between the cam and the ends of the shoes is taken up, so that a very slight motion of the pendulum 43 on its pivotal axis will expand the shoes, bring the friction lining 36 into contact with the drum 23. It will also be obvious that the force with which the shoes 34 are expanded against the drum 23 is proportional to the throw of the pendulum 43, and that this throw is in turn dependent upon the acceleration of the plate 31 on which the apparatus is mounted.

Upon the commencement of a shimmy in the steering wheels of the vehicle, the plate 31 is given a violent oscillatory motion about the axis of the shaft 26 by means of the arm 27, link 28 and the tie rod 16. This motion causes the pendulum 43, by reason of its inertia, to swing first to one side and then to the other side of its normal neutral position, thus applying the shoes 34 to the drum 23 in each direction of the shimmying motion. The braking force thus set up opposes rotation of the shaft 26, and is in turn transmitted through the lever 27 and link 28 to the tie rod 16, so that a powerful damping effect is exerted upon the steering mechanism, which opposes the shimmy movement with a force proportional to the intensity of that movement.

Another application of the invention is shown in Fig. 5, in which 51 is the side frame member of the vehicle to which is secured the usual housing 52 for the vehicle steering gear. Journaled in appropriate bearings 53 is the housing 52 is a steering cross shaft 54, to which is keyed or otherwise rigidly secured a worm wheel 56. The shaft 54 projects from the housing through the side frame member 51 and is provided at its outer end with a steering arm 57, the lower end of which is connected to a steering arm on the axle knuckle, such as the arm 17 shown in Fig. 1, by a drag link of any suitable form (not shown). Suitably mounted in the housing 52 is a worm 58 adapted to engage and actuate the worm wheel 56, and this worm is rigidly secured to and operated by the usual steering shaft 59 in a manner well known in the art to which this invention relates.

It will be obvious that shimmy of the vehicle wheels will be transmitted through the steering mechanism to the arm 57 and thence to the shaft 54, which will thus be given a violent oscillatory motion. In steering gears as usually constructed, this motion is transmitted through the worm wheel 56, the worm 58 and the shaft 59 to the driver of the vehicle, and as heretofore explained this motion not only heavily stresses the steering gear and other portions of the steering mechanism, but is acutely uncomfortable to the driver.

In the present embodiment of the invention the shaft 54 is extended through the wheel 56 and is rigidly keyed as at 61 to a plate 62 which is similar to the plate 31 of Fig. 2. The plate 62 is provided with a pivotal support 63 for shoes 64 having strengthening ribs 65, which are similar to the shoes 34 shown in Fig. 2, and a similar cam 66 is supported between the ends of the shoes 64 and adapted to actuate them. The cam 66 is actuated by a pendulum 67, sensitive to changes in the velocity of movement of the shaft 54, or to the acceleration of this shaft, to expand the shoes 64 in the manner previously described. The housing 52 is provided with a laterally extending circular flange 68, the inner surface of which forms a drum 69 adapted for cooperation with the shoes 64, to set up a braking action, the damping effect of which on the oscillatory motion of the shaft 54 is in proportion to the disturbance. The housing 52 may be closed by a suitable cover plate 71 if desired. The operation of this form of the invention is similar to the operation of the other form described, and will be readily understood.

It will be apparent that in the damping of shimmy as disclosed in this invention, the acceleration of the various parts of the steering gears during normal operation thereof is so low that no appreciable effect is produced on the pendulum or inertia member, so that the device does not affect the ordinary steering action in any way.

It will be evident that this disturbance provides means for the damping of shimmy in the steering gear of motor vehicles, which is very sensitive, and which is particularly efficient in that the degree of control is proportional to the acceleration of the moving parts. This acceleration bears the most direct and simple relation to the force causing the disturbance so that the shimmy is checked at its inception before it has time to reach any appreciable magnitude. In this way, resonance, or the building up of the disturbance by sympathetic vibration, is prevented.

It will be understood that various forms of the invention other than those described above may be used without departing from the spirit or scope of the invention.

Having thus described the invention, what is claimed and desired to be secured by Letters Patent is:

1. A device for damping wheel shimmy in motor vehicles having an axle and a pair of wheels journaled on spindles pivoted to the ends of said axle, comprising a shaft having a lever arm connected to the pivoted spindles, a pendulum carried by said shaft and sensitive to acceleration and deceleration thereof, and means actuated by the pendulum to resist movement of said shaft in proportion to the movement of said pendulum.

2. A device for damping wheel shimmy in motor vehicles having an axle and a pair of wheels journaled on spindles pivoted to the ends of said axle, comprising a shaft connected to said spindles to oscillate in unison therewith, a housing fixed to said axle forming a brake drum concentric with the shaft, brake means carried by the shaft and adapted to engage the drum to resist motion of the shaft and a pendulum carried by the shaft and sensitive to vibratory oscillation thereof adapted to connect said brake means.

3. A device for damping wheel shimmy in motor vehicles having an axle and a pair of wheels journaled on spindles pivoted to the ends of said axle, comprising a brake drum secured to the axle, brake members adapted to engage the drum, a pendulum sensitive to torsional vibratory movements of said spindles and means connecting said pendulum to actuate said brake members.

4. A device for damping vibratory disturbances in a body comprising a pair of brake shoes pivotally mounted on the body, a brake drum for engagement by said shoes, an expanding cam pivotally supported between the ends of said shoes adapted to automatically take up all clearance therebetween, and a pendulum carried by said cam adapted to actuate said shoes upon acceleration and deceleration of the body.

5. A device for damping wheel shimmy in motor vehicles having steering wheels and a steering gear connected thereto including a shaft, comprising a brake drum surrounding the shaft, brake shoes carried by the shaft adapted to engage the drum, and pendulum means carried by the shaft to actuate said shoes in response to acceleration of the shaft.

6. A device for controlling the steering gear of motor vehicles comprising a movable steering element, an inertia device connected to said element, and means actuated by said device to oppose sudden movement of the element and to absorb the energy of such movement.

7. A device for controlling the steering gear of motor vehicles comprising a movable steering element, an inertia device responsive to movement of said element, and energy absorbing means connected to said element and operable by said inertia device to damp sudden movements of said steering gear.

In testimony whereof I affix my signature.

WALTER R. GRISWOLD.